(12) United States Patent
Chin et al.

(10) Patent No.: US 6,356,972 B1
(45) Date of Patent: Mar. 12, 2002

(54) SYSTEM AND METHOD FOR CONCURRENTLY REQUESTING INPUT/OUTPUT AND MEMORY ADDRESS SPACE WHILE MAINTAINING ORDER OF DATA SENT AND RETURNED THEREFROM

(75) Inventors: Kenneth T. Chin, Cypress, TX (US); Clarence K. Coffee, Pembroke Pines, FL (US); Michael J. Collins, Tomball, TX (US); Jerome J. Johnson; Phillip M. Jones, both of Spring, TX (US); Robert A. Lester, Houston, TX (US); Gary J. Piccirillo, Cypress, TX (US)

(73) Assignee: Compaq Information Technologies Group, LP, Houston, TX (US)

( * ) Notice: Subject to any disclaimer, the term of this patent is extended or adjusted under 35 U.S.C. 154(b) by 0 days.

(21) Appl. No.: 09/765,773

(22) Filed: Jan. 19, 2001

Related U.S. Application Data (62) Division of application No. 09/164,189, filed on Sep. 30, 1998, now Pat. No. 6,202,101.

(51) Int. Cl.⁷ .............................................. G06F 13/14
(52) U.S. Cl. ...................................................... 710/310
(58) Field of Search .......................... 710/5, 6, 7, 126, 710/128, 129, 112, 263, 107, 310

(56) References Cited

U.S. PATENT DOCUMENTS

| | | | |
|---|---|---|---|
| 5,634,073 A | 5/1997 | Collins et al. | |
| 5,819,105 A | 10/1998 | Moriarty et al. | |
| 5,905,876 A | * 5/1999 | Pawlowski et al. | ......... 710/112 |
| 5,938,739 A | 8/1999 | Collins et al. | |
| 5,948,081 A | 9/1999 | Foster | |
| 5,974,571 A | 10/1999 | Riesenman et al. | |
| 6,021,451 A | * 1/2000 | Bell et al. | .................... 710/128 |
| 6,047,334 A | 4/2000 | Langendorf et al. | |
| 6,065,088 A | 5/2000 | Bronson et al. | |
| 6,070,215 A | 5/2000 | Deschepper et al. | |
| 6,088,743 A | 7/2000 | Takeda | |
| 6,112,265 A | 8/2000 | Harriman et al. | |
| 6,202,101 B1 | * 3/2001 | Chin et al. | ..................... 710/5 |

* cited by examiner

Primary Examiner—Glenn A. Auve
(74) Attorney, Agent, or Firm—Kevin L. Daffer; Conley, Rose & Tayon P.C.

(57) ABSTRACT

A computer is provided having a bus interface unit coupled between a processor bus, a peripheral bus, and a memory bus. The bus interface unit includes a processor controller linked to the processor bus for controlling the transfer of cycles from the processor to the peripheral bus and memory bus. Those cycles are initially forwarded as a request, whereby the processor controller includes a memory request queue separate from a peripheral request queue. Requests from the memory and peripheral request queues can be de-queued concurrently to the memory and peripheral buses. This enhances throughput of read and write requests; however, proper ordering of data returned as a result of read requests and data transferred as a result of write requests must be ensured. An in-order queue is also present in the processor controller which records the order in which the requests are dispatched to the peripheral and memory buses from the peripheral and memory request queues. Data ensuing from the request can be re-ordered and presented to the destination based on the current pointer position within the in-order queue. Thus, the in-order queue keeps track of the order in which data is transferred across the processor bus consistent with the order in which the previous requests were transferred.

17 Claims, 5 Drawing Sheets

SYSTEM AND METHOD FOR CONCURRENTLY REQUESTING INPUT/OUTPUT AND MEMORY ADDRESS SPACE WHILE MAINTAINING ORDER OF DATA SENT AND RETURNED THEREFROM

This is a divisional application from prior application Ser. No. 09/164,189, filed Sep. 30, 1998, now U.S Pat. No. 6,202,101.

BACKGROUND OF THE INVENTION

1. Field of the Invention

This invention relates to a computer and, more particularly, to a bus interface unit which concurrently dispatches memory and input/output ("I/O") request cycles to respective target devices and maintains proper ordering of data sent to and returned from the memory and I/O target devices.

2. Description of the Related Art

Modem computers are called upon to execute instructions and transfer data at increasingly higher rates. Many computers employ CPUs which operate at clocking rates exceeding several hundred MHz, and further have multiple buses connected between the CPUs and numerous input/output devices. The buses may have dissimilar protocols depending on which devices they link. For example, a CPU local bus connected directly to the CPU preferably transfers data at a faster rate than a peripheral bus connected to slower input/output devices. A mezzanine bus may be used to connect devices arranged between the CPU local bus and the peripheral bus. The peripheral bus can be classified as, for example, an industry standard architecture ("ISA") bus, an enhanced ISA ("EISA") bus or a microchannel bus. The mezzanine bus can be classified as, for example, a peripheral component interconnect ("PCI") bus to which higher speed input/output devices can be connected.

Coupled between the various buses are bus interface units. According to somewhat known terminology, the bus interface unit coupled between the CPU bus and the PCI bus is often termed the "north bridge". Similarly, the bus interface unit between the PCI bus and the peripheral bus is often termed the "south bridge".

The north bridge, henceforth termed a bus interface unit, serves to link specific buses within the hierarchical bus architecture. Preferably, the bus interface unit couples data, address and control signals forwarded between the CPU local bus, the PCI bus and the memory bus. Accordingly, the bus interface unit may include various buffers and/or controllers situated at the interface of each bus linked by the interface unit. In addition, the bus interface unit may receive data from a dedicated graphics bus, and therefore may include an advanced graphics port ("AGP"). As a host device, the bus interface unit may be called upon to support both the PCI portion of the AGP (or graphics-dedicated transfers associated with PCI, henceforth is referred to as a graphics controller interface, or "GCI"), as well as AGP extensions to the PCI protocol.

There are numerous tasks performed by the bus interface unit. For example, the bus interface unit must orchestrate timing differences between a faster CPU (processor) local bus and a slower mezzanine bus, such as a PCI bus or a graphics-dedicated bus (e.g., an AGP bus). In addition, the bus interface unit may be called upon to maintain time-sensitive relationships established within the pipelined architecture of a processor bus. If data attributable to a request forwarded across the processor bus is dependent on data of a previous request, then the timing relationship between those requests must be maintained. In other words, timing of requests which occur during a request phase of the pipeline must be maintained when data is transferred during a later, data transfer phase of the pipeline in order to ensure coherency of the pipelined information.

A stalling mechanism is sometimes employed to account for timing differences between a slower peripheral bus and a faster processor or memory bus. Stall cycles can therefore occur within a particular phase of the processor bus pipeline, and particularly in the snoop phase. Modem processor buses, such as the a Pentium® Pro bus employs numerous phases: arbitration, request, error, snoop, response, and data transfer.

Stalling, however, does not by itself draw one transaction ahead of another in the pipeline of the processor bus. A deferral mechanism is therefore used for the purpose of allowing a more critical transaction to proceed to completion through the various phases ahead of an earlier-placed transaction (i.e., a transaction placed into the pipeline ahead of the more critical transaction). The transaction being deferred is therefore said to be set aside in favor of a transaction which needs to be serviced quickly.

For example, in an attempt to immediately service requests to faster local memory (i.e., system memory of substantially contiguous semiconductor memory space), modern processor bus architecture allow memory request cycles to be completed upon the processor bus ahead of cycles to the peripheral bus. This means that peripheral-destined cycles which may be snoop stalled are deferred to allow faster, memory-destined cycles to be drawn from the in-order queue of the pipeline ahead of the slower, deferred peripheral-destined cycles. The deferred cycle must, however, be re-initiated at a later time beginning at the first phase (i.e., arbitration phase) of the processor pipeline. Many clock cycles are then needed to again place the deferred transaction back into the snoop phase. Associated with each deferral, a processor bus clocking penalty must be paid for each deferral operation.

An advantage arises if the number of snoop stall cycles and deferred cycles can be minimized. A bus interface unit which can possibly forward memory request cycles without having to snoop stall immediately preceding peripheral request cycles would be a significant improvement to the conventional snoop stall routine. The benefit of dispatching memory requests as soon as possible, and dispatching peripheral requests whenever the peripheral bus or peripheral data is available, proves advantageous as a tool for optimizing the processor bus bandwidth and memory accesses. A bus interface unit which can minimize snoop stall without necessarily having to pay the burdensome penalty of cycle deferral would pose an important advancement over conventional bus interface unit architecture.

SUMMARY OF THE INVENTION

The problems outlined above are in large part solved by an improved bus interface unit hereof. The present bus interface unit can dispatch memory-destined request cycles (memory request cycles) concurrent with peripheral-destined request cycles (peripheral request cycles). In this manner, peripheral request cycles can be immediately sent if the peripheral bus is clear or peripheral data is available. Also important is the benefit of transferring a memory request cycle to system memory so that the processor optimally receives instructions or data stored therein.

The memory bus which receives memory requests or data from the bus interface unit is one which is compatible with high speed semiconductor memory. Examples of suitable memory include: DRAM, synchronous DRAM (SDRAM). A graphics-dedicated bus may also be coupled to the bus interface unit. If the graphics bus is an AGP-PCI bus, then it may be linked to the bus interface unit by an AGP interface to effectuate (e.g., 66 MHz 1×AGP transfers or 133 MHz 2×AGP data transfers). The bus interface unit maintains a PCI interface which is synchronous to the processor interface and supports PCI burst cycles. The graphics bus or mezzanine bus coupled to the bus interface unit may interchangeably be termed a "peripheral bus". The term peripheral bus is generic in its application to any bus on which a peripheral device such as an electronic display, disk drive, printer, network interface card, SCSI, etc. can be coupled. Thus, a peripheral device generically involves an input/output device which is accessed within the input/output address space.

The present bus interface unit is configured as a north bridge between a processor local bus, a peripheral bus, and a memory bus. The processor bus can link at least one, and certainly more, processors and associate cache storage locations within those processors. Additionally, the memory bus links a memory controller within the bus interface unit to system memory denoted as semiconductor memory. To expedite transfers between the various buses, the bus interface unit includes a processor controller, a memory controller, and a peripheral controller. The processor controller is coupled to the processor bus, the memory controller is coupled to the memory bus, and the peripheral controller is coupled to the peripheral bus (i.e., PCI bus or AGP bus). Coupled between the various controllers within the bus interface unit are address and data queues. Depending on where the address or data originates, and the point of destination, a specific address or data queue is optimally present within that respective transfer path.

Attributed to the processor controller is a peripheral request queue and a memory request queue. The peripheral request queue stores certain information relating to a peripheral request (i.e., a request to the peripheral bus and specifically a peripheral device connected to the peripheral bus). Likewise, the memory request queue stores information specific to memory requests destined for the memory bus or memory device. Requests within the memory request queue are stored in the order in which they are received. Likewise, requests to the peripheral request queue are stored in the order in which they are received. According to one embodiment, each request queue may be a circular first-in-first-out ("FIFO") circular buffer, or may have input and output points which indicate the input location or "head" of a series of filled locations and an output location or "tail" which tags the culmination of the series of filled locations. Among information stored within the peripheral and memory request queues are addresses as well as the type of request being solicited (i.e., whether the request is to memory or a peripheral device, or is a read request or a write request). An entry number may be used within the memory request queue to resolve coherency with a snoop result to cache. According to another embodiment, entry numbers may also be associated with the peripheral request queue to note the relative order in which requests are placed within each queue and among both queues if, for example, the requests are placed in the respective queues out-of-order. The entry numbers need not be employed in the peripheral request queue (and memory request queue) if the requests are issued to the respective queues in-order and maintained in-order within respective memory and peripheral data queues containing the responses to the respective requests.

Given the example where the requests are issued out-of-order, the first request forwarded from the processor bus may be destined for the peripheral bus. This means that request will be routed to the peripheral request queue and given an entry number 0. The next request may be destined for memory and will be placed in the memory request queue along with an entry number 1. The entry number, or tag, associated with each request is sent along with the address as well as the type of request being sent (e.g., whether the request is a read request or a write request). That information is presented to the respective address and data queues of the bus interface unit based on its entry number. This implies that the earliest entry number within the memory request queue will be de-queued before later entry numbers concurrent with earlier entry number de-queued within the peripheral request queue before later entry numbers within the peripheral request queue.

Given an example where the requests are issued in-order, the first request is maintained in order within the peripheral request queue, while the second, third and fourth request issued to the memory request queue are maintained in order therein. Furthermore, the second, third and four data transfer results (i.e., read or write data) are maintained in the same order within the memory data queue. The output pointer within an in-order queue ensures the peripheral data will be drawn from the peripheral data queue before data is drawn from the memory data queue. The output pointer is incremented to allow the next (i.e., third and fourth) request results to be drawn in order from the memory data queue. If the requests and corresponding results within respective memory and peripheral queues are forwarded and maintained in order, then simpler logic associated with the input and output points of an in-order queue can be beneficially employed to resolve order of read data returned to the processor or write data to the memory or peripheral device. However, if out-of-order requests are sent, possibly due to multiple requesters being used, then the more elaborate entry number and tagging scheme may be used.

The in-order queue maintains either an input/output pointer system or entry numbers depending on whether the requests and corresponding read/write data are sent in-order or out-of-order. If a pointer system is used, the output pointer keeps track of which data queue location is to forward data next (i.e., whether data will be pulled from the output pointer location or head of memory data queue M2P or P2M, or whether data is pulled from the output pointer location or head or peripheral data queue I2P or P2I). If entry numbers are used, the entry numbers are identical to the entry numbers which are present in the peripheral and memory request queues. The entry numbers stored in the in-order queue serve to memorialize the order in which the requests are forwarded from the processor bus to either the peripheral request queue or the memory request queue. In this fashion, the in-order queue makes note of the request order so that when data is to be forwarded either from the memory or peripheral device (or to the memory or peripheral device), that data will be presented across the processor bus in a specific sequential fashion. The in-order queue thereby beneficially maintains the data order across the processor bus based on the previous request order. In this manner, the critical timing of data transfers relative to earlier requests is properly maintained within the processor pipeline to ensure coherency.

According to one embodiment, a computer is provided. The computer includes a processor controller having both a memory request queue and a peripheral request queue. The memory request queue stores a sequence of memory requests and the peripheral request queue stores a sequence of peripheral requests, both of which are eventually sent to either a memory or peripheral target. The peripheral device is therefore coupled to receive the peripheral request. Depending on its use or type, the peripheral device can be arranged on a printed circuit board outside of, or exclusive of, a board on which the processor controller is configured.

According to another embodiment, the processor controller may include a decoder which decodes a series of bits within each of the memory and peripheral requests to identify the memory request as destined exclusively for the memory request queue and to identify the peripheral request as destined exclusively for the peripheral request queue. Thus, the decoded series of bits relates to bits either within the peripheral address space or the memory address space. Another set of bits denotes the entry order at which the peripheral and memory requests enter their respective queues. The entry order is noted as a tag which follows along with its respective address to define each request (peripheral or memory request) relative to one another in the sequence at which they are dispatched from the processor bus. The in-order queue also stores the entry number to ensure subsequent data is sent across the processor bus in an order defined by the order in which the request were earlier sent across the processor bus.

According to another embodiment, the use of entry order bits or tags is avoided. As such, the requests and corresponding data within each of the peripheral or data queues are maintained in order. Resolution between data from the peripheral or memory data queues is achieved by simply implementing a FIFO output, or output pointers, indicating whether data is removed from the peripheral data queue or the memory data queue corresponding to the ordering or previously issued requests.

A bus interface unit is preferably provided within the computer. The bus interface unit is configured between a processor bus, a peripheral bus, and a memory bus. The bus interface unit includes an in-order queue coupled to store an order in which a plurality of requests are dispatched from the processor bus to either the peripheral bus or the memory bus. A peripheral request queue is coupled to store peripheral addresses associated with a first set of the plurality of requests destined exclusively for the peripheral bus. A memory request queue is coupled to store memory addresses associated with a second set of the plurality of requests destined exclusively for the memory bus. A comparator may be included and coupled between a pointer associated with the in-order queue and a pointer associated with data queues. The comparator is configured to dispatch the peripheral data and the memory data across the processor bus commensurate with the order in which the plurality of earlier-dispatched requests were stored in the in-order queue. More specifically, the comparator determines the relative position of the pointer attributed to the in-order queue. Based on that position, the comparator determines the next data to be sent from a queue having data resulting from that request. Once a match to data is ascertained, based on where the pointer resides in the in-order queue, that data is then forwarded across the processor bus (either as read data to the processor or as write data from the processor). In this manner, the current status of the pointer and the entry numbers stored within the pointer establish proper ordering of data subsequently forwarded across the processor bus even though requests may be sent to target devices out-of-order from requests earlier sent across the processor bus. Instances in which the requests are sent out-of-order occur due to peripheral requests and memory requests being sent concurrently, where one type of request is not delayed based on the other. As an alternative to the comparator, more simplistic logic can be implemented merely to pull data from the respective memory or peripheral data queues based on the order of requests maintained within the in-order queue. Avoidance of the comparator assumes requests are issued in-order and maintained in-order within respective data queues.

A method is also presented, according to another embodiment. The method includes steps for sending a plurality of requests across the processor bus and subsequently sending data across the processor bus according to the order in which the requests were previously sent. The steps involve loading memory requests of the plurality of requests destined for a memory device into a memory request queue and possibly assigning a first tag identifying the order in which the memory requests are sent across the processor bus. Peripheral requests of the plurality of requests destined for a peripheral device are loaded into a peripheral request queue and assigned a second tag identifying the order in which the peripheral requests are sent across the processor bus. While the memory requests and peripheral requests are loaded, the first and second tags are also loaded into an in-order queue to identify the order in which the memory requests are loaded relative to one another as well as the order in which the memory requests are loaded relative to the peripheral requests. Memory data and peripheral data can then be accessed corresponding to respective memory requests and peripheral requests. The first tag is assigned to corresponding memory data and the second tag is assigned to corresponding peripheral data. The first tag within the memory data can be compared to the previously sent first tag within the memory requests, while the second tag within the peripheral data can be compared to the previously sent second tag within the peripheral requests. The comparison yields an arrangement or sequence at which the memory and peripheral data can then be sent across the processor bus. In this fashion, the sequence of peripheral and memory data sent across the processor bus is ordered relative to peripheral and memory requests previously sent across the processor bus. Thus, if memory address 1 attributed to memory request 1 occurs before peripheral address 2 associated with peripheral request 2, then the memory data attributed to memory request 1 is sent across the processor bus before the peripheral data corresponding to the peripheral request.

BRIEF DESCRIPTION OF THE DRAWINGS

Other objects and advantages of the invention will become apparent upon reading the following detailed description and upon reference to the accompanying drawings in which.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1:
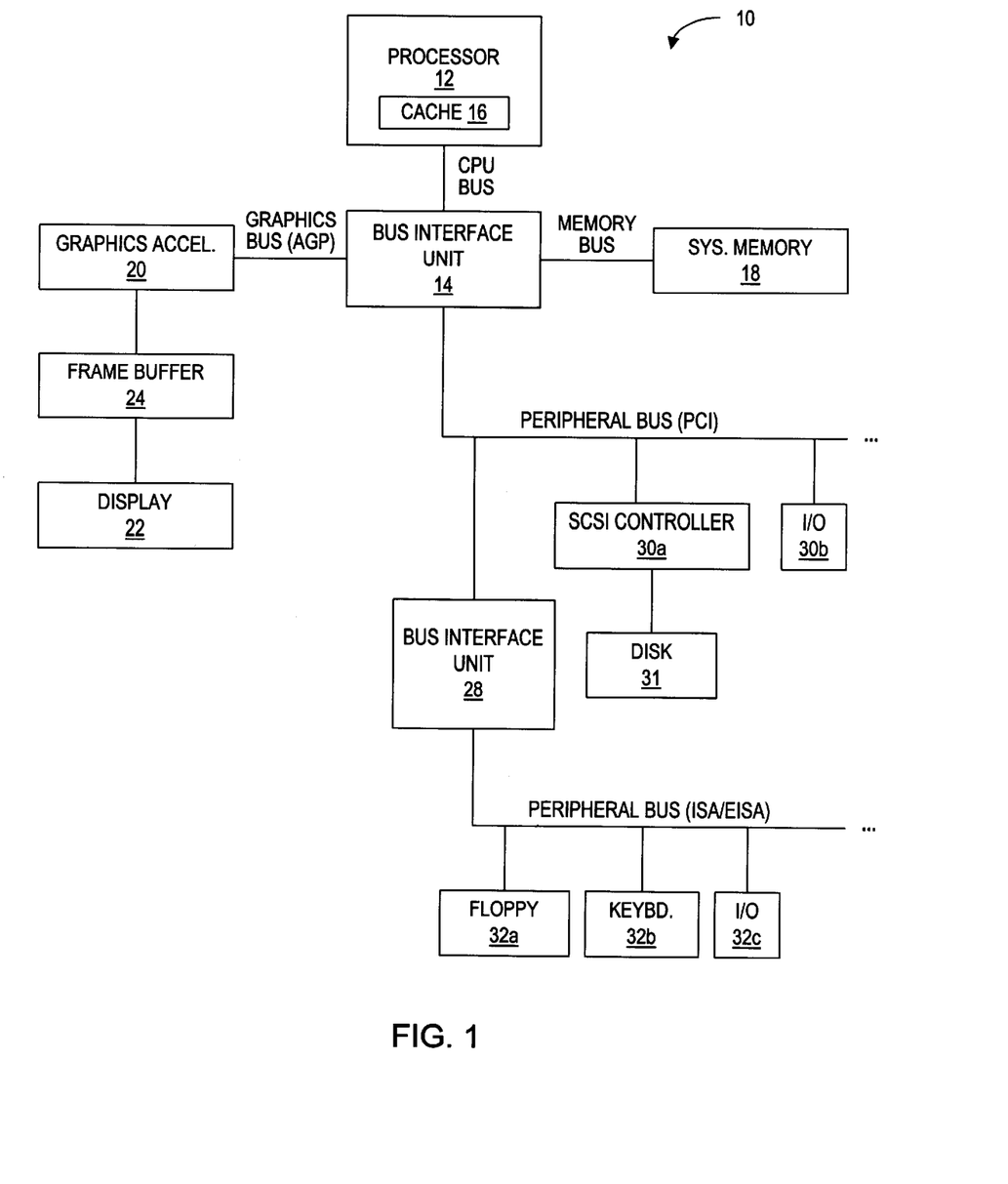
FIG. 1 is a block diagram of a computer system comprising various buses and bus interface units.

Turning now to the drawings, FIG. 1 illustrates a computer 10 having multiple busses, including a CPU bus, a mezzanine or PCI bus, and a peripheral bus or ISA/EISA bus. The CPU bus connects a CPU or processor 12 to a bus interface unit or north bridge 14. A cache memory 16 is preferably embodied within processor 12 and/or linked to processor 12 by the CPU bus. Bus interface unit 14 provides an interface between components clocked at similar rates. Bus interface unit 14 preferably contains a memory controller which allows communication to and from system memory 18. A suitable system memory 18 comprises DRAM or SDRAM. Interface unit 14 may also include a graphics port to allow communication to a graphics accelerator 20. A graphics port, such as AGP, provides a high performance, component level interconnect targeted at three dimensional graphics display applications and is based on performance extensions or enhancements to PCI. AGP interfaces are generally standard in the industry, the description of which is available from Intel Corporation.

Generally speaking, AGP is physically, logically, and electrically independent of the PCI bus and is intended for the exclusive use of a display device 22 coupled to the graphics port (AGP) by a graphics accelerator and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT") a liquid crystal display ("LCD"), etc.

Interface unit 14 is generally considered an application specific chip set or application specific integrated circuit ("ASIC") that provides connectivity to various busses, and integrates other system functions such as memory interface and P1394. Systems memory 18 is considered the main memory and refers to a portion of the addressable memory that the majority of memory accesses target. System memory is accessed via interface unit 14, and is considered the largest continuous memory space of computer 10.

Unlike the CPU bus which runs at speeds comparable to CPU 12, PCI bus generally runs at speeds of, e.g., 33 MHz or lower. Another bus interface unit 28 is coupled between two dissimilar peripheral busses (i.e., the PCI bus and the ISA/EISA bus). Similar to unit 14, unit 28 is an ASIC or group of ASICs that provide connectivity between various busses, and may also include system function which can possibly integrate one or more serial ports. Attributed to the PCI bus are input/output ("I/O") devices 30, one of which can be a SCSI controller link between, for example, a secondary disk drive and the PCI bus. I/O devices 30 generally operate at higher speeds than I/O devices 32, examples of which include a floppy disk drive, a keyboard, etc.

Figure 2:
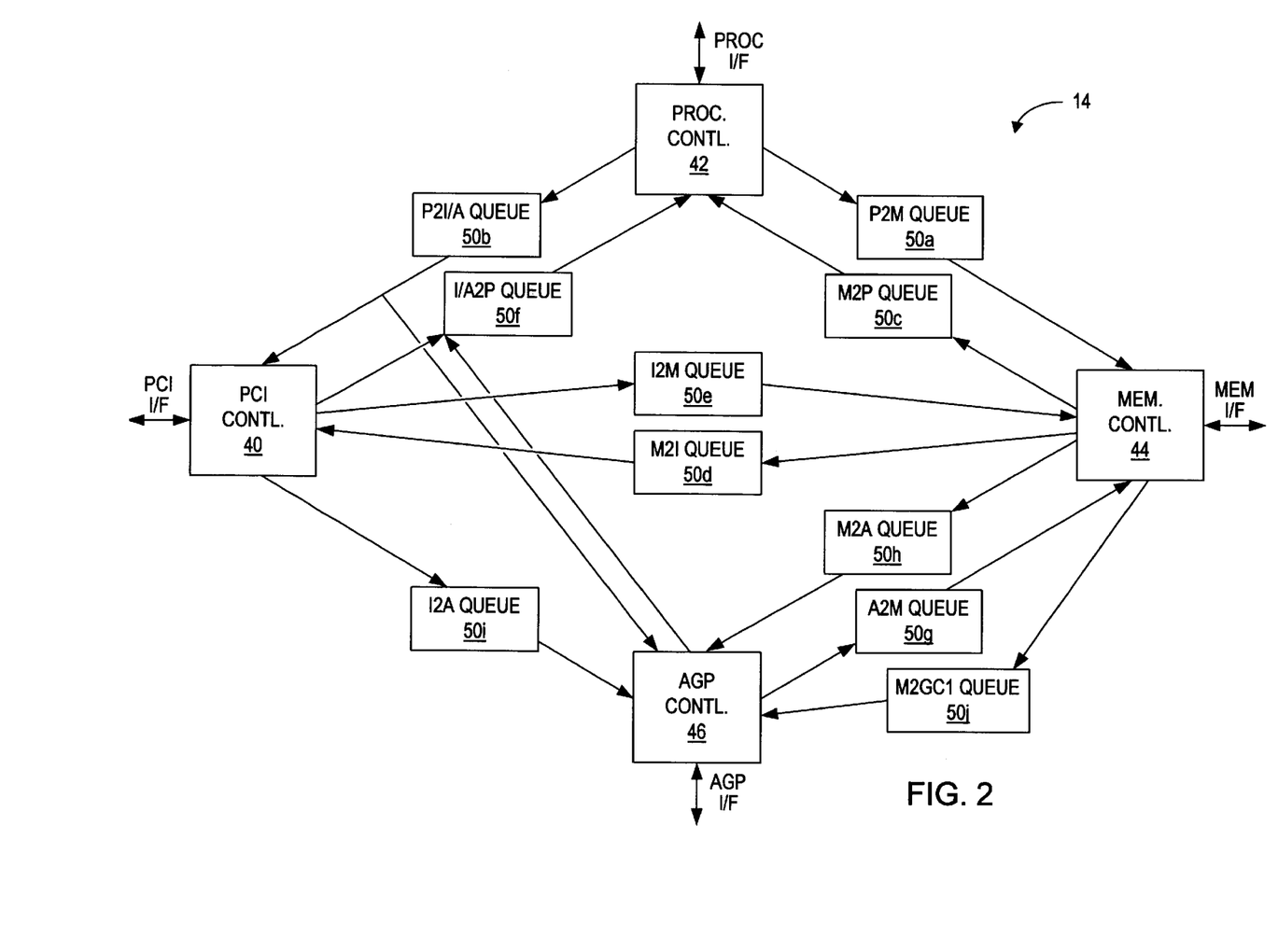
FIG. 2 is a block diagram of a bus interface unit containing address and data queues coupled between a processor controller, a PCI bus controller, a graphics bus controller and a memory controller.

Turning to FIG. 2, details regarding bus interface unit 14 are shown. The various sub-components of interface unit 14 can be connected on a monolithic substrate for high end computer applications. Interface unit 14 operates in conjunction with other bus interface units such as interface unit 28, and preferably includes at least four interfaces and multiple address and data queues. Each interface is unique to the specific bus protocol of the bus to which it connects. As shown, the PCI interface ("PCI IF") includes a PCI controller 40 which enables transfer of information (control, address and data) to and from the PCI bus.

Attributed to each of the other busses is a respective controller which provides an interface for information sent across the respective bus. Thus, in addition to the PCI controller 40, a processor controller 42, a memory controller 44 and an AGP controller 46 are embodied within interface controller 14, as shown in FIG. 2. In addition to the various controllers, there are multiple address and data queues. Each controller operates independent of the others, and cycles are passed between controllers using queues which link respective controllers. FIG. 2 illustrates nine queues: processor-to-memory queue (P2M queue) 50a, processor-to-PCI/AGP queue (P2I/A queue) 50b, memory-to-processor queue (M2P queue) 50c, memory-to-PCI queue (M2I queue) 50d, PCI-to-memory queue (I2M queue) 50e, PCI/AGP-to-processor queue (I/A2P queue) 50f, AGP-to-memory queue (A2M queue) 50g, memory-to-AGP queue (M2A queue) 50h, and PCI-to-AGP queue (I2A queue) 50i. It is recognized, that if needed, an additional graphics interface (i.e., GCI) beyond AGP can be used for graphics intensive applications. Each of the queues 50 shown in FIG. 2 communicate with each other through the various controllers and/or control signals routed directly between respective queues. Separating the major blocks as shown allows for a significant amount of concurrency.

Processor controller 42 controls the CPU interface and the various queues 50 linked to the CPU interface. Processor controller 42 allows the CPU (or processor) to pipeline cycles and allows several cycles to be stored within the processor controller. Additionally, processor controller 42 schedules accesses to cache storage locations within one or more processors.

Memory controller 44 controls possibly multiple banks of SDRAMs, as well as the CS, DQM, RAS, CAS, WE, CKE and address signals sent to those banks. In addition, memory controller 44 generates several control signals to respective queues 50 for memory data bus control. Memory controller 44 arbitrates among processor writes, processor reads, peripheral (i.e., PCI, AGP and GCI) writes, peripheral reads and refresh. Arbitration for each cycle is pipelined into the current memory cycle which ensures that the next memory address is available on the memory bus before the current cycle is complete. This results in minimum delay, if any, between memory cycles. Memory controller 44 is capable of reading ahead on PCI master reads and will do so if the PCI master issues a read multiple command. Interface unit 14 can then continue providing data to the PCI master at a high rate.

PCI controller 40 ensures compatible interface to the PCI bus protocol. When the processor accesses the PCI bus, PCI controller 40 operates as a PCI master. When a PCI master, (e.g., PCI I/O device) accesses memory, PCI controller 40 acts as a PCI slave. Processor-to-PCI cycles are buffered in queue 50*b* and then presented to controller 40. Controller 40 must determine when this queue needs to be emptied before running in a slave mode.

Processor controller 42 can also be thought of as any device responsible for decoding processor cycles, running snoops to the processor cache storage locations, and providing miscellaneous logic such as soft reset. Functionality of a processor controller used in the bus interface unit is generally well known as any unit which accepts cycles from the CPU bus and then parses them out to the appropriate controllers 40, 44, 46 and/or queues 50. It is recognized that the processor controller consists of a number of sub-modules that can be grouped into various logic subsystems such as a processor bus tracker/queue cycle manager, a processor bus master state machine, snoop control, etc. Similar to processor controller 42, the PCI controller 40 or the AGP controller 46 is also well known as containing a series of state machines which control the PCI/AGP interface. Data passing through the PCI controller 40 is preferably broken into three basic sub-modules: PCI master interface, PCI target (slave) interface and PCI glue logic. PCI controller 40 communicates with memory controller 44, processor controller 42 and queues 50 through various control signals internal to interface unit 14. AGP controller 46 interfaces externally to a 66 MHz, 32 bit AGP/PCI bus and interfaces internally to controllers and queues. Memory controller 44 supports AGP master reads and writes to the system memory using AGP or PCI protocol. Processor controller 42 initiates PCI protocol reads and writes to the AGP master frame buffer and registers. The various queues 50 provide data flow buffers between interfaces.

The various queues 50 can be classified as address and data queues or merely data queues depending on the flow direction of information and the controllers being linked by the respective queues. The following Table I represents a list of the various data and address queues 50, their size, and the data/address flow of each queue:

TABLE I

| Queue Name | Data/Address | No. Locations | Source | Destination |
|---|---|---|---|---|
| P2M(A) | Address | 4 slots | processor | Memory |
| P2M(D) | Data | 4 cache lines | processor | Memory |
| P2I(A) | Address | 8 slots | processor | PCI or GCI |
| P2I(D) | Data | 8 quad words | processor | PCI or GCI |
| M2P | Data | 2 cache lines | memory | Processor |
| I2P | Data | 2 cache lines | PCI or GCI | Processor |
| I2M(A) | Address | 4 slots | PCI | Memory |
| I2M(D) | data | 4 cache lines | PCI | Memory |
| M2I | Data | 2 cache lines | memory | PCI |
| M2A | Data | 8 cache lines | memory | AGP |
| A2M(D) | Data | 8 cache lines | GCI or AGP | Memory |
| A2M(A) | Address | 8 slots | GCI or AGP | Memory |

It is recognized that numerous other queues can be employed. For example, Table I could include queues to another graphics-dedicated transfers associated with PCI, such as GCI. It is also recognized that for a PCI or AGP peripheral device to write to memory, the respective I2M queue and A2M queue transfer both address and data information before presenting that information to the memory controller 44. Information sent from PCI controller 40 (or AGP controller 46) to processor controller 42 is buffered merely as data within the I/A2P queue 50*f*, and information sent from the processor controller 42 to memory controller 44 is buffered as address and data within the P2M queue 50*a*. AGP controller 46 and PCI controller 40 may be deemed and henceforth generically noted as a common controller (hereinafter a "peripheral controller") linked between the processor and one or more peripheral devices connected to a peripheral bus (i.e., the AGP or PCI bus).

Figure 3:
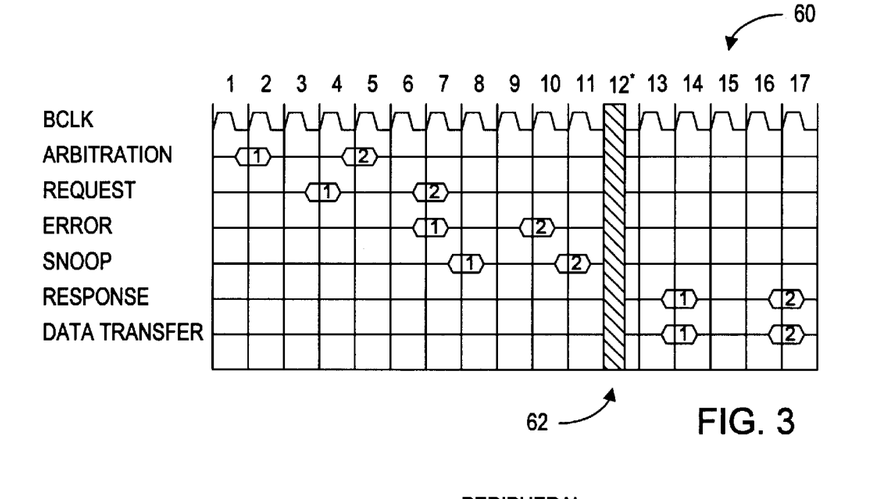
FIG. 3 is a timing diagram of transactions pipelined through transaction phases of a processor bus linked to the processor controller.

Referring to FIG. 3, a timing diagram 60 is shown of transaction phases associated with a Pentium® Pro processor bus. Two transactions are illustrated and labeled as transaction 1 and transaction 2. When the requesting agent does not own the bus, transactions will begin with an arbitration phase, whereby a requesting agent solicits ownership of the processor bus. After bus ownership is granted, the transaction enters the request phase, in which the bus owner dispatches requests and address information on the bus. A subsequent error phase indicates any parity errors triggered by the request. Every transaction that is not canceled due to an error is then forwarded to the snoop phase. A snoop result will indicate if the address driven for a transaction references a valid or modified (dirty) cache line in any bus agent cache. The snoop result may also indicate whether a transaction will be completed in-order or whether it should be deferred for possible out-of-order completion. For this reason, timing diagram 60 indicates a shaded portion 62 to indicate a potential for numerous cycles within the shaded time-frame. For example, a snoop stall of transaction 1 or transaction 2 can occur within time-frame 62. Alternatively, a deferral of transaction 1 may occur in time-frame 62 to allow transaction 2 to proceed ahead of transaction 1. Eventually a transaction will enter the response phase either directly, after a snoop stall, or after a deferred response. Thus, the response phase indicates whether the transaction has failed or succeeded, whether transaction completion is immediate or deferred, whether the transaction will be retried, and whether the transaction contains a data phase.

The timing of the response phase relative to the earlier, pre-response phases is therefore dependent on the type of request being dispatched. If the request type is, for example, a read transaction to a slower peripheral bus, then that transaction may be stalled in the snoop phase or deferred in lieu of a subsequent transaction to faster memory. In most instances, data transferred during the data transfer phase is time dependent on other data being transferred during that phase. Also, data being transferred must arrive at its destination not so earlier that it would be impermissibly overwritten by subsequent data or so late that the data is not present when needed. In other words, the data arriving at the destination or target must be ordered based on the order established by the requests. If the sequence of arriving data follow the sequence of corresponding requests, data coherency is assured.

The timing relationship between addresses within the request phase must therefore be carried over to the data transfer phase. If it is necessary that data of an initial request be transferred across the processor bus before data associated with a subsequent request, then attention must be paid to ensure the timed relationship between the two data transactions is maintained relative to the request sequence. This is not normally a problem if the request phases naturally pipeline through all the phases until completion of the data transfer phase. Snoop stalling or cycle deferring will not, as a general rule, change the critical timed relationship of the pre-set pipeline sequence. However, if the requests are somehow taken out of order or if sequential requests of two different types are somehow concurrently dispatched to the target, then an accounting of return data (within a read request) or forwarded data (within a write request) must be made note of and made consistent with the timed sequence of those requests.

Figure 4:
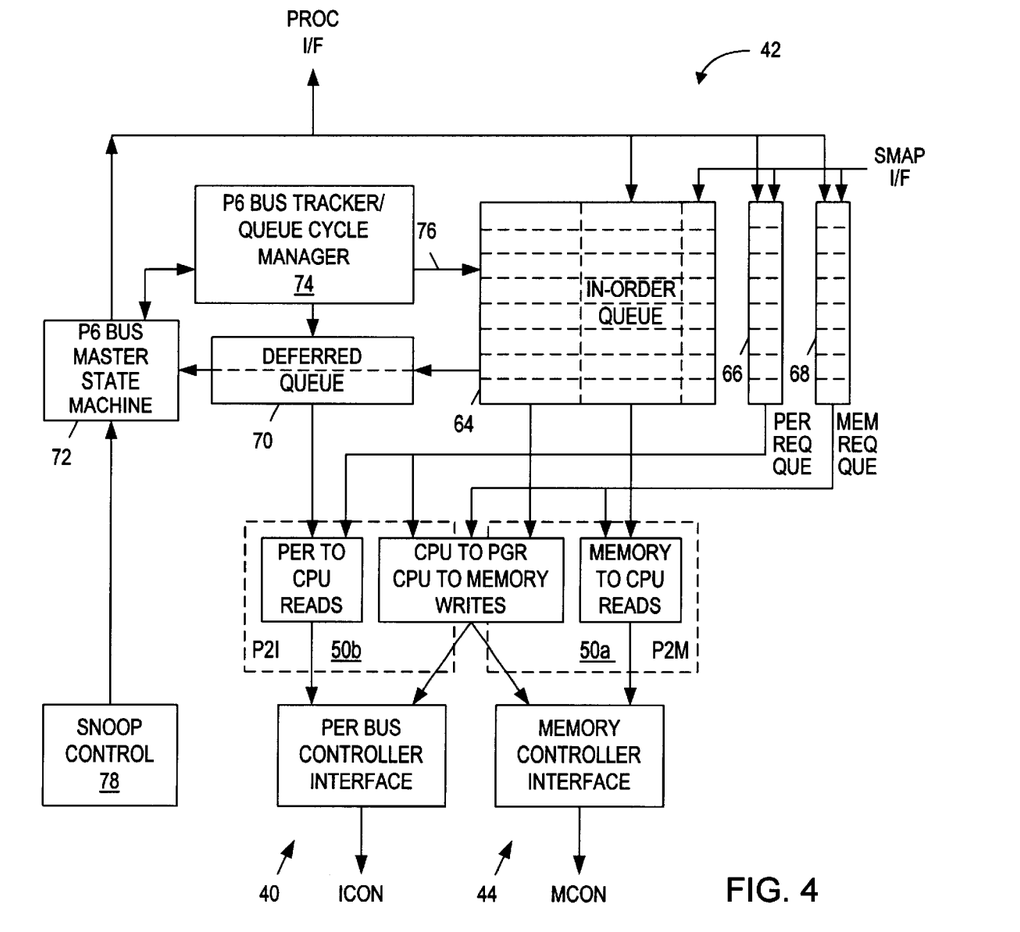
FIG. 4 is a block diagram of the processor controller with memory and I/O addresses decoded into respective I/O and memory request queues for concurrently requesting the I/O and memory target devices.

FIG. 4 illustrates at least a portion of processor controller 42, as well as select queues and controllers/interfaces for illustrating request cycles forwarded from a processor bus. Processor controller 42 includes an in-order queue 64, a peripheral request queue 66, and memory request queue 68. Queues 64, 66, and 68 receive various items of information associated with a request transaction dispatched on the processor bus. The first request transaction upon the processor bus has an associated identification or entry number (e.g., entry 0). The entry number 0 is stored in the in-order queue 64 and either in queue 66 or queue 68 depending on whether that request is a peripheral request or a memory request. If it is a memory request, then the entry number 0, as well as the memory address, will be loaded into queue 68, and not queue 66.

A decoder is used to ascertain whether a request will be targeted for queue 66 or queue 68. The request will be loaded in queue 68 if the address falls within the memory address space. Otherwise, a request within a peripheral ("I/O") address space will be loaded within queue 66. A decoder is therefore used to decode the address associated with the request, and the decoder is configured by a system memory map and configuration registers ("SMAP"). SMAP will configure registers during boot-up of the computer system (FIG. 1) so that the decoder will know that addresses within a certain range will be placed within its appropriate queue 66 or queue 68.

Only addresses and the order in which the requests are forwarded, as well as the type of request, are stored as bits of information within queue 66 or queue 68. Instead of storing the address of the request, in-order queue 64 stores the attributed entry number, request type, and snoop results. Further details regarding the entry number information, request type, snoop results, and addresses will be discussed in reference to FIG. 5. FIG. 4 is presented to illustrate that requests can be de-queued concurrently from queues 66 and 68. Those requests, including associated addresses, can be loaded into address queues. In the example shown, queue 50b receives addresses destined for the peripheral controller and specifically a peripheral device. The addresses can be attributed to a read transaction or a write transaction. Therefore, the request is to access a location within a peripheral device in order to read information from that device or write information to the addressed location. Memory requests can be sent concurrently with peripheral requests and, therefore, are de-queued from queue 68 onto a queue shown in the example of FIG. 4 as queue 50a. Queue 5a stores addresses destined for the memory controller and more specifically system memory connected to the system memory bus. The memory requests are therefore addresses which access a memory location so that data can be written to that location from the processor or data can be read from that location and dispatched to the processor.

The entry number associated with each address is forwarded along with that address to their respective peripheral or memory controller. The type of request is also sent, and serves to determine whether the request is a read or write request. In-order queue 64 also forwards snoop results arising from the processor cache. Those snoop results indicate whether the processor cache contains modified or dirty data so that, if necessary, a write back operation can be asserted to the memory controller via queue 50a. For this reason, snoop results are sent only to queue 50a corresponding with memory reads and writes.

FIG. 4 further illustrates a deferred queue 70. Queue 70 receives deferred requests. As noted above, deferred requests are those taken out of the pipeline (or in-order queue) to allow non-deferred requests to proceed ahead of the deferred requests. In the example shown, two deferred requests can be taken from the in-order queue and thereafter used to inform the processor bus master state machine 72 of their presence. Among several functions, state machine 72 determines when the deferred request is to be re-initiated onto the processor pipeline, beginning with the arbitration phase. This may occur whenever the peripheral bus is cleared or data becomes available on the peripheral bus. For this reason, deferred requests are attributed to peripheral read cycles, and therefore to queue 50b. Once the peripheral bus clears or peripheral data is present, then the deferred replies are run on the processor and placed again into the in-order queue to be tracked to completion.

Bus tracker 74 keeps track of transactions proceeding along the various phases of the processor bus. It must therefore know when snoop stalls, deferrals, and retry cycles arise and note those cycles within the pointer controller. Bus tracker 74 therefore tracks the transactions within each phase of the processor bus and notes where request transactions are stored within in-order queue 64 by applying a pointer 76 to the position receiving requests. More specifically, the pointer notes the order in which requests are presented from the processor bus by virtue of the entry number or tag corresponding with each request within queue 64. That entry number proves valuable when data is returned from the peripheral device or memory through a read operation, or data is written to the peripheral device or memory through a write operation. That data must be orchestrated relative to the earlier-sent request.

Further shown in FIG. 4 is snoop control logic 78 which, for example, is configured to receive a request from a requesting device such as a peripheral device. If the address being requested indicates modified or dirty data within cache of the processor, then the processor will respond with a write back operation and present the snoop results (i.e., write back) to in-order queue 64.

Figure 5:
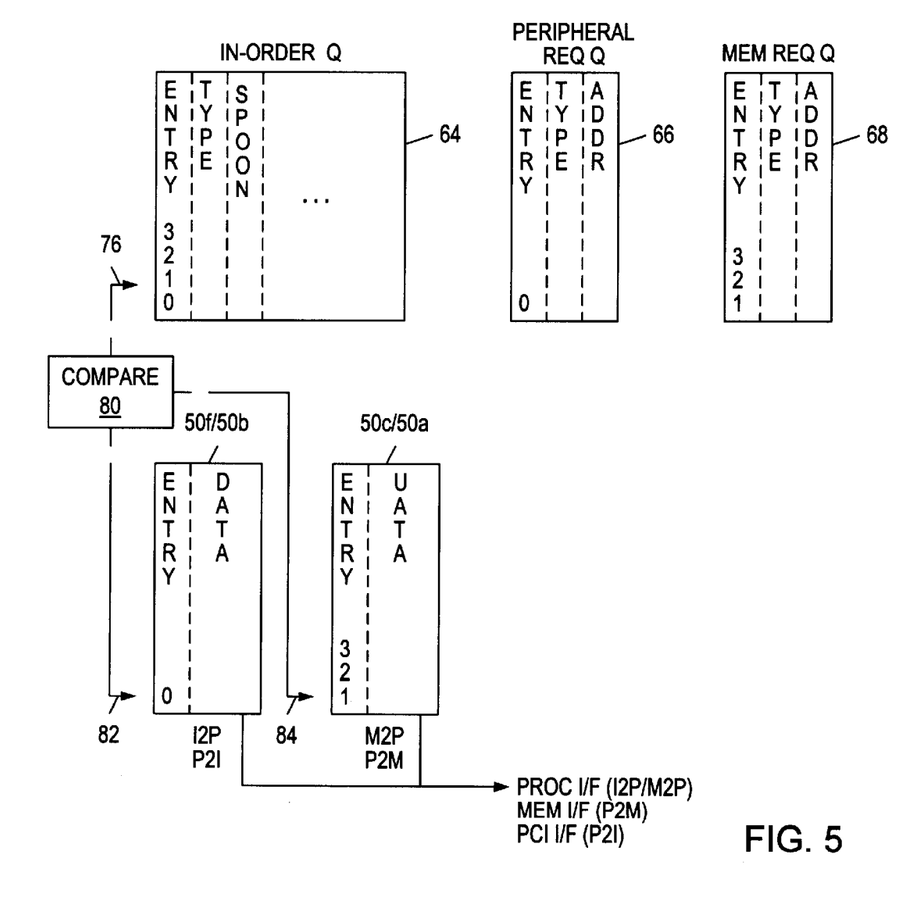
FIG. 5 is a block diagram of pointers used to sequentially de-queue I/O requests separate from and concurrent with de-queuing memory requests, and for comparing an entry number (or tag identifier) attributed to subsequently sent data with an entry number stored in the in-order queue to ensure the initial order between I/O and memory data is maintained in the processor bus pipeline, according to one embodiment.

Referring to FIG. 5, details of information which can be stored in queues 64, 66, and 68 are shown. Further shown is an example of a sequence of requests forwarded from the processor bus. The first request is shown as numeral 0, and is denoted as a peripheral request since it is decoded and uniquely placed into the peripheral request queue 66. The position in which the peripheral request is placed is noted with a tag as entry 0. Entry 0 is also noted in queue 64, absent the request address. The next request is shown as a memory request, where the memory address and entry numeral 1 is stored in memory request queue 68. Entry numeral 1 is also stored in queue 64, absent the request address. The example proceeds with the following two requests being memory request numerals 2 and 3. The order in which either memory or peripheral requests are dispatched from the processor bus is noted in queue 64, whereas queues 66 and 68 merely identify the entry number with a particular address so that the entry number is unique to that address. The address and therefore the entry number is de-queued from queues 66 and 68 simply in the order in which they arrive (i.e., first-in-first-out).

If the request is a read request to memory, the memory request will access a memory location and data at that location is temporarily stored within an M2P queue 50c. Arranging the order in which data is de-queued from queue 50c depends on where the pointer is relative to queue 64. For example, if pointer 76 is at entry numeral 0, then data is not de-queued from queue 50c until pointer arrives at entry numeral 1, in the example shown. Once pointer 76 is at entry numeral 1, then data attributed to entry numeral 1 is de-queued and thereafter presented to the processor bus. If the memory request is a write request, then the address will be held in the P2M queue (queue 50a) until that request's entry number matches the current in-order queue entry number.

In the example provided, a compare unit 80 is present for comparing the pointer status 76 of queue 64 with the pointer status 82 and 84 of respective queues 50f/50b and 50c/50a. Queue 50f is used to temporarily store data returned from a peripheral device in response to a read request to that peripheral device from the processor. Queue 50b temporarily stores data written from the processor to the peripheral device based on a peripheral write request. Knowing the type of request (read or write) is therefore needed to be sent with the request address. The request type is decoded to allow the ensuing data to be placed in the appropriate data queue so that it can be appropriately routed to its proper destination. In the embodiment shown, the destination is either the processor, system memory, or the peripheral device depending on which queue 50 the data is stored.

Figure 6:
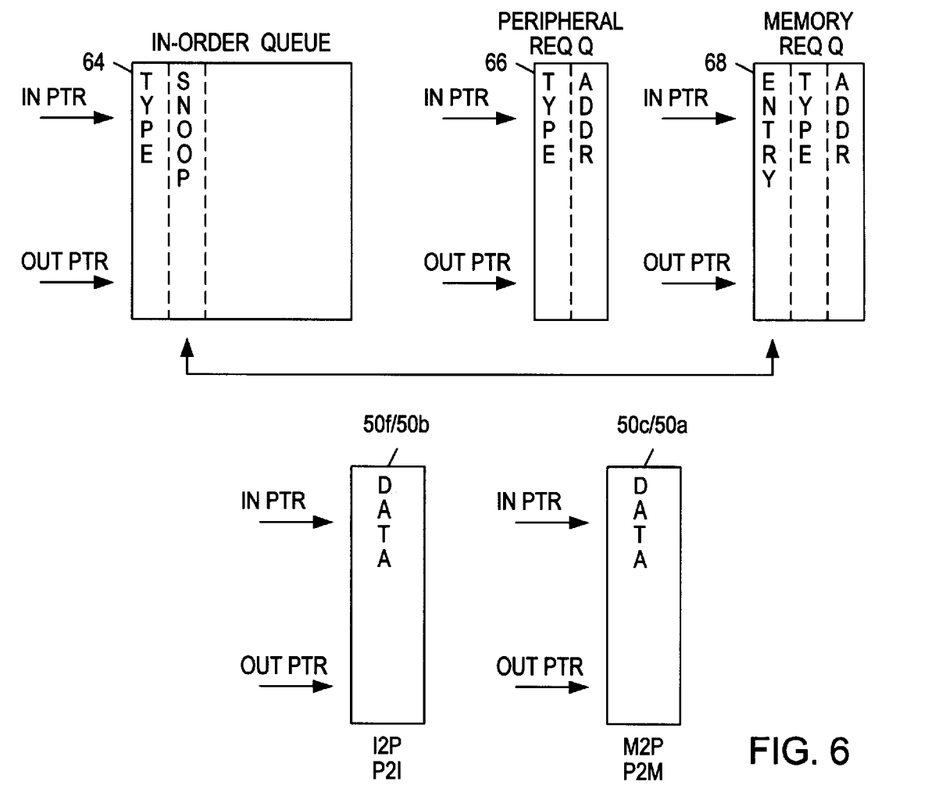
FIG. 6 is a block diagram of pointers used to sequential de-queue I/O requests and memory requests, and for forwarding corresponding data from respective I/O data queue and memory queue in the same order in which the requests were forwarded, according to another embodiment.

FIG. 6 illustrates an alternative configuration to that shown in FIG. 5. More specifically, a block diagram illustrates the order of requests associated with a memory read or write are maintained in that same order when the corresponding data is placed in memory data queue 50c/50a. Likewise, the order of requests associated with a peripheral read or write are maintained in that same order when the corresponding data is placed in peripheral data queue 50f/50b. Thus, if the order of requests is maintained throughout the data reply, then entry numbers are not needed, and the attribution of those entry numbers from the request to data can be avoided. The order of the requests and the corresponding returning is therefore maintained to eliminate and substantially avoid complex tagging system, entry numbers and compare units.

FIG. 6 indicates that in-order queue 64 output pointer functions solely to determine which data to read—either data from the output pointer, or tail, of memory data queue or peripheral data queue. All information from the requests queues, to the corresponding controllers and into the respective data queue therefore remains in the same (initial) order. By its nature, either the memory or peripheral data needed next is at the head of the corresponding queue, and determining which queue to draw from is simply handled by the output pointer (out ptr) within the in-order queue 64. The type stored in the output pointer location within the in-order queue determines if the data at the head output pointer location is either read or write data, and thus whether the data is to be drawn from or sent to M2P or P2M (attributed to memory data queue), or is drawn from or sent to I2P or P2I (within a peripheral data queue). The output pointer is the location which defines the head of the queue containing the oldest request address or data, whereas the input pointer is the location which defines the tail of the queue containing the newest request address or data. Each queue contains input and output pointers, and there is no need to detect a relationship between queues, or to compare information stored in various queues as in the out-of-order embodiment.

The memory request queue 68 is the only queue, according to the in-order embodiment, which maintains an entry number. The memory request queue entry numbers are used to resolve snoop results maintained in the in-order queue 64. If the snoop results indicate there is no hit to cache, then the memory request can proceed. Entry numbers (and corresponding requests) are dispatched based on their entry number comparison to the snoop results.

Queues 64, 66, and 68 involve any temporary storage buffer which can store sequences of information, including addresses, placed therein. According to the out-of-order embodiment, compare unit 80 includes any logic which can compare digital bits of information attributed to an entry number or tag. According to the in-order embodiment, an assumption is made that information associated with a memory request are always maintained in order relative to each other, and information associated with a peripheral request are always maintained in order relative to each other. It would be appreciated to those skilled in the art having the benefit of this disclosure that the embodiments described herein are believed capable of performing efficient transfer of peripheral and memory requests, followed by proper ordering of data across the processor bus in response to those requests. Various modifications and changes may be made as would be obvious to a person skilled in the art having the benefit of this disclosure. It is intended that the following claims be interpreted to embrace all such modifications and changes and, accordingly, the specification and drawings are to be regarded in an illustrative rather than restrictive sense.

What is claimed is:

1. A bus interface unit configured between a processor bus, a peripheral bus and a memory bus, comprising:
   an in-order queue coupled to store an order in which a plurality of requests are dispatched from the processor bus to either the peripheral bus or the memory bus;
   a peripheral request queue for storing peripheral addresses associated with a first set of the plurality of requests destined exclusively for the peripheral bus; and
   a memory request queue for storing memory addresses associated with a second set of the plurality of requests destined exclusively for the memory bus.

2. The bus interface unit as recited in claim 1, further comprising means for dispatching the peripheral addresses from the peripheral request queue concurrently with memory addresses from the memory request queue.

3. The bus interface unit as recited in claim 1, wherein the peripheral addresses access peripheral data within a peripheral device linked to the peripheral bus, and wherein the memory addresses access memory data within a memory device linked to the memory bus.

4. The bus interface unit as recited in claim 3, further comprising an output pointer associated with the in-order queue for pointing to an output pointer location within a peripheral data queue or a memory data queue for drawing a corresponding peripheral data or memory data therefrom.

5. The bus interface unit as recited in claim 4, further comprising a comparator coupled to dispatch the peripheral data and the memory data across the processor bus commensurate with the order in which the plurality of requests are stored in the in-order queue.

6. The bus interface unit as recited in claim 5, wherein the comparator compares a series of bits identifying each datum of the peripheral data and the memory data with another series of bits indicating said order in which the plurality of requests are dispatched to determine if the sequence of peripheral data and memory data sent across the processor bus matches the sequence at which the plurality of requests are dispatched across the processor bus.

7. The bus interface unit as recited in claim 1, wherein the peripheral addresses access a location in which peripheral data is to be placed, and wherein the memory addresses access a location in which memory data is to be placed.

8. The bus interface unit as recited in claim 7, further comprising a comparator coupled to dispatch the peripheral data and the memory data across the processor bus commensurate with the order in which the plurality of requests are stored in the in-order queue.

9. The bus interface unit as recited in claim 8, wherein the comparator compares a series of bits identifying each datum of the peripheral data and the memory data with another series of bits indicating said order in which the plurality of requests are dispatched to determine if the sequence of peripheral data and memory data sent across the processor bus matches the sequence at which the plurality of requests are dispatched across the processor bus.

10. A method for sending a plurality of request across a processor bus and subsequently sending data across the processor bus according to the order in which the requests were previously sent, the method comprising:
    loading memory requests of the plurality of requests destined for a memory device into a memory request queue;
    loading peripheral requests of the plurality of requests destined for a peripheral device into a peripheral request queue;
    maintaining within an in-order queue the order in which the memory and peripheral requests were loaded into corresponding memory and peripheral requests queues; and
    forwarding the data associated with the memory and peripheral requests across the processor bus according to a sequence equal to the order maintained within the in-order queue.

11. The method as recited in claim 10, wherein said loading the memory request comprises assigning a first tag identifying the order in which the memory requests are sent across the processor bus.

12. The method as recited in claim 11, wherein said loading the peripheral request comprises assigning a second tag identifying the order in which the peripheral requests are sent across the processor bus.

13. The method as recited in claim 12, wherein said maintaining comprises loading the first and second tags into the in-order queue for identifying the order of the memory requests relative to one another and further relative to the peripheral requests.

14. The method as recited in claim 13, further comprising:
    accessing memory data and peripheral data corresponding to respective said memory requests and said peripheral requests;
    assigning the first tag to corresponding said memory data and assigning the second tag to corresponding said peripheral data; and
    comparing the first tag within the memory data to the previously sent first tag within the memory requests while comparing the second tag within the peripheral data to the previously sent second tag within the peripheral requests to arrange the sequence at which the memory and peripheral data are sent across the processor bus to be equal with the sequence at which the earlier sent memory and peripheral requests are sent.

15. The method as recited in claim 14, wherein said loading the first and second tags into the in-order queue identifies the order of the peripheral requests relative to one another and relative to the memory requests.

16. The method as recited in claim 14, wherein said comparing comprises arranging memory data and peripheral data sequentially across the processor bus according to the order in which the first tag is attributed to the memory requests, the second tag is attributed to the peripheral requests, and the first and second tags are attributed among each other.

17. The method as recited in claim 14, further comprising concurrently dispatching the memory and peripheral requests from the memory and peripheral requests queues.

* * * * *